US012754346B2

(12) United States Patent
Chen et al.

(10) Patent No.: US 12,754,346 B2
(45) Date of Patent: Oct. 6, 2026

(54) PRECIPITATION ESTIMATION METHOD AND DEVICE BASED ON HYBRID SCANNING OF WEATHER RADAR NETWORKING

(71) Applicant: Zhejiang Atmospheric Detection Technology Support Center, Hangzhou (CN)

(72) Inventors: Hao Chen, Hangzhou (CN); Liang Chen, Hangzhou (CN); Zhangwei Wang, Hangzhou (CN); Jian Sun, Hangzhou (CN); Ruiqi Xie, Hangzhou (CN); Xinglai Lu, Hangzhou (CN); Han Wang, Hangzhou (CN)

(73) Assignee: Zhejiang Atmospheric Detection Technology Support Center, Zhejiang (CN)

( * ) Notice: Subject to any disclaimer, the term of this patent is extended or adjusted under 35 U.S.C. 154(b) by 0 days.

(21) Appl. No.: 19/073,860

(22) Filed: Mar. 7, 2025

(65) Prior Publication Data

US 2026/0160923 A1 Jun. 11, 2026

(30) Foreign Application Priority Data

Oct. 12, 2024 (CN) ......................... 202411423498.2

(51) Int. Cl.
*G01W 1/14* (2006.01)
*G01S 7/02* (2006.01)
(Continued)

(52) U.S. Cl.
CPC ............... *G01W 1/14* (2013.01); *G01S 7/025* (2013.01); *G01S 7/411* (2013.01); *G01S 13/87* (2013.01);
(Continued)

(58) Field of Classification Search
CPC .......... G01W 1/14; G01S 7/025; G01S 7/411; G01S 13/87; G01S 13/89
See application file for complete search history.

(56) References Cited

U.S. PATENT DOCUMENTS 9,223,020 B1 * 12/2015 Crosmer ................ G01S 13/86
9,535,158 B1 * 1/2017 Breiholz .................. G01S 7/04
(Continued)

FOREIGN PATENT DOCUMENTS

CN 105678846 A 6/2016
CN 116863098 A 10/2023

OTHER PUBLICATIONS

Title of the Item: Chinese Doctoral Dissertation Full-text Database Publication Date: Apr. 15, 2007 Name of the Author: Xiao Yanjiao Article Title: Three-Dimensional Multiple-Radar Reflectivity Mosaics and It's Application Study.

*Primary Examiner* — Marcus E Windrich
(74) *Attorney, Agent, or Firm* — Nitin Kaushik

(57) ABSTRACT

The invention provides a precipitation estimation method based on hybrid scanning of weather radar networking, including: constructing an initial data grid according to a projection mode, a networking range and a resolution of radar networking precipitation estimation, constructing an elevation data grid according to a terrain elevation data in radar networking area in the same projection mode, networking range and resolution; converting coordinates of the initial data grid into longitude and latitude coordinates, and calculating an intersection height between a geocentric line of the longitude and latitude coordinates of the initial data grid and an elevation scanning data of each radar in the radar networking area; selecting a scanning data corresponding to an intersection height nearest to a preset near-surface height H in the elevation data grid as the scanning data of the initial
(Continued)

data grid for precipitation assessment according to the intersection height corresponding to each radar.

9 Claims, 9 Drawing Sheets

(51) Int. Cl.

| | |
|---|---|
| ***G01S 7/41*** | (2006.01) |
| ***G01S 13/87*** | (2006.01) |
| ***G01S 13/89*** | (2006.01) |
| ***G01S 13/95*** | (2006.01) |
| ***G01W 1/10*** | (2006.01) |

(52) U.S. Cl.
CPC .............. *G01S 13/89* (2013.01); *G01S 13/95* (2013.01); *G01W 1/10* (2013.01)

(56) References Cited

U.S. PATENT DOCUMENTS

| | | | | |
|---|---|---|---|---|
| 10,302,815 | B1 * | 5/2019 | Kronfeld | G01W 1/10 |
| 11,131,790 | B2 * | 9/2021 | Ganshin | G01W 1/10 |
| 2017/0146652 | A1 * | 5/2017 | Jackson | G01S 7/411 |
| 2018/0158342 | A1 * | 6/2018 | Gharote | G01S 13/913 |

* cited by examiner

PRECIPITATION ESTIMATION METHOD AND DEVICE BASED ON HYBRID SCANNING OF WEATHER RADAR NETWORKING

CROSS-REFERENCE TO RELATED APPLICATIONS

The application claims priority to Chinese patent application No. 202411423498.2, filed on Oct. 12, 2024, the entire contents of which are incorporated herein by reference.

TECHNICAL FIELD

The present invention relates to the technical field of data processing, in particular to a precipitation estimation method and a device based on hybrid scanning of weather radar networking.

BACKGROUND

At present, the implementation methods of precipitation estimation of weather radar networking are mainly established in two categories: first calculating the precipitation estimation products of each radar station and then networking fusion, and first networking fusion and then calculating precipitation estimation products. In the first category, the precipitation estimation products of each radar station participating in the network are firstly calculated, the precipitation estimation products of each single station are networked according to the spatial position. In the precipitation data fusion, the radar detection overlap area is processed by the maximum or average algorithm. In the second category, the radar data is networking fusion, and then the precipitation estimation method is inverse through the fused data.

The existing precipitation estimation methods of weather radar networking have the following shortcomings. First, when calculating the single station precipitation estimation product, the area near the radar center is affected by the current urban development, especially the X-band small radar is mostly located in the city. Although the lift elevation data is adopted, it may still be affected by topographic factors such as ground object pollution and shielding, resulting in deviation of precipitation estimation. In addition, with the diversification of current radar body scanning modes, the elevation angle of radar body scanning is also changing, while the fixed Hybrid Scanning Reflectivity (HSR) processing mode is not applicable. At the same time, in the current precipitation realization mode of weather radar networking, the precipitation estimation products of a single station are calculated first, and then the precipitation data fusion mode is carried out. For the processing of the overlapping areas of radar scanning, no matter the maximum or average processing method is adopted, the precipitation estimation value obtained is most likely to be the effective scanning data of the not nearest surface, resulting in deviation of the precipitation estimation results. In particular, when there is a zero layer region in the hybrid scanning of radar single station precipitation estimation, it will cause a large deviation due to the precipitation overestimation of the zero layer.

Secondly, the precipitation estimation is carried out after the radar data networking fusion, and the data is selected in the overlapping observation area of multiple radars. First of all, the scanning data of the lowest elevation angle of the radar in the selected overlapping area are easily affected by the shielding factors such as terrain and buildings, resulting in a significant underestimate of the precipitation estimation of the radar network compared with the actual observation. Secondly, the precipitation estimation product selected for the inversion of the maximum radar reflectivity factor data in the overlapping region is greatly affected by different seasons. For example, the height of the strong centroid echo of the radar in summer is usually about 8 km in strong convection, while the intensity of precipitation or hail is significantly weakened due to the influence of hot air evaporation during falling, resulting in a significant overestimation of the estimated precipitation compared with the actual observation. In spring and autumn, under the influence of the zero layer, the inverse precipitation estimation will be overestimated than the actual precipitation. Thirdly, selecting the radar reflectivity factor data at a preset height in the overlapping region to invert the precipitation estimate product is equivalent to using CAPPI (reflectivity factor for 360 azimuth scanning by radar at a specific height) data, that is, a layer of plane data at a fixed height, which is the altitude. The closer the data is to the surface, the closer the precipitation estimation is to the reality, so the topographic differences will cause the selected height to be unable to fully satisfy the near surface data.

SUMMARY

The invention provides a precipitation estimation method and a device based on hybrid scanning of weather radar networking, which solves a defect of deviation in precipitation estimation of hybrid scanning of weather radar networking in existing technologies, and realizes improvement of precipitation estimation ability of weather radar networking.

The invention provides a precipitation estimation method based on hybrid scanning of weather radar networking, which includes:

- constructing initial data grid according a projection mode, a networking range and a resolution of precipitation estimation of radar network, and constructing the elevation data grid according to the terrain elevation data in radar network area in the same projection mode, networking range and resolution;
- converting coordinates of the initial data grid into longitude and latitude coordinates, and calculating an intersection height between the geocentric line of the longitude and latitude coordinates of the initial data grid and the elevation scanning data of each radar in the radar networking area;
- selecting scanning data corresponding to the intersection height in the range of intersection heights nearest to the preset near-surface height H in the elevation data grid as the scanning data of the initial data grid for precipitation assessment according to the intersection height corresponding to each radar.

According to a precipitation estimation method based on hybrid scanning of weather radar networking provided by the invention, selecting the scanning data corresponding to the intersection height nearest to the preset near-surface height H in the elevation data grid as the scanning data of the initial data grid for precipitation evaluation, including:

- in the case that the scanning data nearest to the preset near-surface height H in the elevation data grid is dual polarization radar scanning data, taking an entire dual polarization amount of the scanning data nearest the preset near-surface height H in the elevation data grid as the scanning data of the initial data grid for precipitation assessment.

According to a precipitation estimation method based on hybrid scanning of weather radar networking provided by the invention, selecting the scanning data of the scanning position corresponding to the nearest preset near-surface height H in the elevation data grid as the scanning data of the initial data grid for precipitation evaluation according to the intersection height corresponding to each radar, including:

in the case that the scanning data nearest to the preset near-surface height H in the elevation data grid is single polarization radar scanning data, determining whether there is dual polarization radar scanning data intersecting the intersection height in the range of intersection heights between the redundancy selection range H−T/2 and H+T/2, and T is the data redundancy thickness;

if there is dual polarization radar scanning data, taking the dual polarization radar scanning data as the scanning data of the initial data grid for precipitation evaluation;

if no dual polarization radar scanning data exists, taking the single polarization radar scanning data as the scanning data for the initial data grid for precipitation assessment.

According to a precipitation estimation method based on hybrid scanning of weather radar networking provided by the invention, selecting the scanning data corresponding to the intersection height nearest to the preset near-surface height H in the elevation data grid as the scanning data of the initial data grid for precipitation evaluation, including:

in the case that the scanning data of the initial data grid is single polarization radar scanning data, performing the precipitation assessment using the Z-R relationship according to the single polarization radar scanning data.

According to a precipitation estimation method based on hybrid scanning of weather radar networking provided by the invention, selecting the scanning data corresponding to the intersection height nearest to the preset near-surface height H in the elevation data grid as the scanning data of the initial data grid for precipitation evaluation, including:

in the case that the scanning data of the initial data grid is dual polarization radar scanning data, using a quantitative precipitation estimation algorithm to evaluate the precipitation according to the dual polarization radar scanning data.

According to a precipitation estimation method based on hybrid scanning of weather radar networking provided by the invention, using the quantitative precipitation estimation algorithm to evaluate precipitation according to the dual polarization radar scanning data, including:

in the case that the radar reflectivity factor in the dual polarization radar scanning data is greater than the first preset threshold, and the radar differential propagation phase shift rate is greater than the second preset threshold, determining the precipitation type as non-liquid precipitation, and calculating the precipitation rate according to the radar reflectivity factor;

in the case that the radar reflectivity factor is less than or equal to the first preset threshold, or the radar differential propagation phase shift rate is less than or equal to the second preset threshold, determining the precipitation type as liquid precipitation, and calculating the precipitation rate according to the radar differential propagation phase shift rate.

According to a precipitation estimation method based on hybrid scanning of weather radar networking provided by the invention, calculating the precipitation rate R according to the radar reflectivity factor $Z_H$ by the following formula:

$$R(Z_H)=0.019Z_{0.761}^{H};$$

calculating the precipitation rate R according to the radar differential propagation phase shift rate $K_{DP}$ by the following formula:

$$R(K_{DP})=44.84K_{DP}^{0.763}$$

The invention further provides a precipitation estimation device based on hybrid scanning of weather radar network, including:

a construction module, configured to construct the initial data grid according to the projection mode, the networking range and the resolution of the radar network precipitation estimation, and to construct the elevation data grid according to the terrain elevation data of the radar network area in the same projection mode, networking range and resolution;

a calculation module, configured to convert the coordinates of the initial data grid into longitude and latitude coordinates, and calculate the intersection height of the geocentric line of the longitude and latitude coordinates of the initial data grid and the elevation scanning data of each radar in the radar networking area;

a selection module, configured to select the scanning data of the range between the intersection heights of each radar and the nearest preset near-surface height H in the corresponding elevation data grid as the scanning data of the initial data grid for precipitation assessment.

The invention further provides an electronic device, including a memory, a processor and a computer program stored in the memory and running on the processor, and the precipitation estimation method based on hybrid scanning of the weather radar network as described above, when the program is executed by the processor, is implemented.

The invention further provides a non-transient computer-readable storage medium on which a computer program is stored which, when executed by a processor, implements a precipitation estimation method based on hybrid scanning of weather radar networking as described above.

The invention further provides a computer program product comprising a computer program which, when executed by a processor, implements a precipitation estimation method based on hybrid scanning of weather radar networking as described above.

The precipitation estimation method and device provided by the invention are based on hybrid scanning of the weather radar network. By introducing the terrain elevation data on the basis of the radar network, the multi-altitude layer data of the terrain networking radar hybrid scanning is obtained, and the initial data grid is constructed on the basis of the multi-radar network observation. Near-surface range of networking radar scanning data is selected according to terrain data for mixing, so as to realize the selection of near-surface data in overlapping observation areas of multiple radars. Precipitation is estimated based on the effective scanning data of adjacent surface under terrain, and the network hybrid scanning data can effectively avoid the influence of ground objects. Meanwhile, data selection is not limited by the radar body scanning mode, and the setting of near-surface range is adopted. The idea of effective scanning data of the nearest surface can be applied to the whole range of the radar network area, so as to optimize the selection of application data of the precipitation estimation algorithm and improve the precipitation estimation ability of weather radar network.

BRIEF DESCRIPTION OF DRAWINGS

In order to more clearly state technical solutions in the invention or existing technologies, a brief introduction is given below to the embodiments or drawings required to be used in the description of the existing technologies. It is obvious that the drawings in the description below are embodiments of the invention. For ordinary skill in the art, other drawings can also be obtained according to these drawings without creative labor.

DETAILED DESCRIPTION OF THE EMBODIMENTS

In order to make objectives, technical solutions and advantages of the invention more clear, the technical solution of the invention is described clearly and completely in combination with the drawings in the invention. Obviously, the embodiments described are part of the embodiments of the invention, but not all embodiments. Based on the embodiments of the invention, all other embodiments obtained by ordinary skill in the art without creative labor fall within the scope of protection of the invention.

Heavy rainfall affects all aspects of life and social economy, such as agriculture, water conservancy power generation, human outdoor travel, and the like. The continuous occurrence of heavy rainfall may lead to urban waterlogging, landslides, debris flows and other disasters. Doppler weather radar, as an effective monitoring method for strong weather processes, has high spatial and temporal resolution, and has broad application prospects in quantitative precipitation monitoring and short-term forecast.

In the detection of single-station radar, the observation range, clutter interference, terrain shielding and equipment maintenance are greatly affected, especially in the low-altitude area, affected by the curvature of the earth and terrain, so that the radar signal can not effectively cover the ground precipitation area at a long distance.

With the development of meteorological quality, the number of meteorological radars is increasing. In order to overcome the limitation of a single radar, multi-radar networking technology has been widely studied and applied. By deploying multiple radars in an area and observing together, wider space coverage and more comprehensive data acquisition can be achieved. This networking mode can effectively make up for the shortcomings of single radar in spatial resolution, coverage and timeliness.

Figure 1:
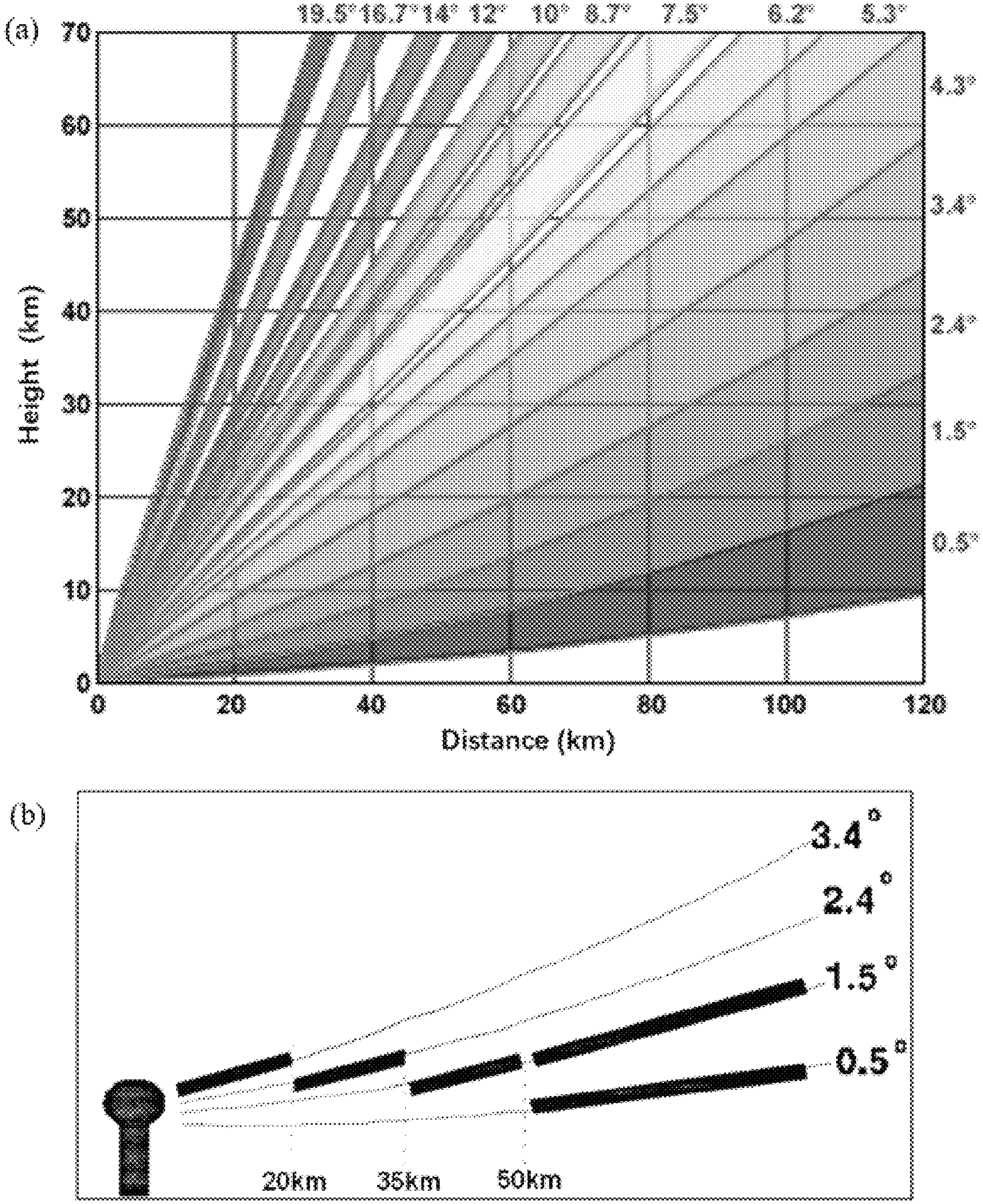
FIG. 1 is a schematic diagram of VCP21 body scanning mode in the precipitation estimation method based on hybrid scanning of weather radar networking provided by the invention.

The calculation of radar single-station precipitation estimation products is mainly based on the hybrid scanning method, the main idea of which is to select the effective scanning data of the nearest surface which is not affected by ground objects. Taking VCP21 body scanning as an example, 3.4° data is used in the range of 0-20.35 km, and 2.4°, 1.5° and 0.5° scanning data are used outside 20.35-35.15 km, 35.15-50 km and 50 km, respectively. Among them, FIG. 1(*a*) is an elevation side view of VCP21 body scanning mode, and FIG. 1(*b*) is a schematic diagram of single-station hybrid scanning.

After networking radar data fusion, precipitation estimation is performed. There are many methods for data selection in the overlapping observation area of multiple radars, usually as follows: 1. The radar reflectivity factor ($Z_H$)(dBZ) data of the lowest level radar elevation scanning in the overlapping region is selected. 2. The maximum radar reflectivity factor ($Z_H$)(dBZ) data in the overlapping region is selected. 3. The radar reflectivity factor ($Z_H$)(dBZ) data for a preset height in the overlapping area is selected. 4. The maximum radar reflectivity factor ($Z_H$)(dBZ) data between the center of two or more radar beams, the bottom layer and the top layer in the overlapping area.

Taking the topographic elevation map of a certain region as an example, it can be seen that the altitude of the northern region is relatively low, while the altitude of the central and southern region is basically above 600 m, and some areas are above 1000 m. If the networking radar selects the data below the altitude of 600 m, the precipitation estimation error in the central and southern regions is large, while if the network data above the altitude of 1000 m is used to invert the precipitation estimation, the error in the northern region is large, so it cannot meet the requirement that the data always selected is the networking data of the near-surface radar. Finally, the maximum radar reflectivity factor between the center of two or more radar beams, the bottom layer and the top layer in the overlapping region is also affected by terrain, and the near-surface data at different altitudes cannot be selected, resulting in overestimation of precipitation.

Figure 2:
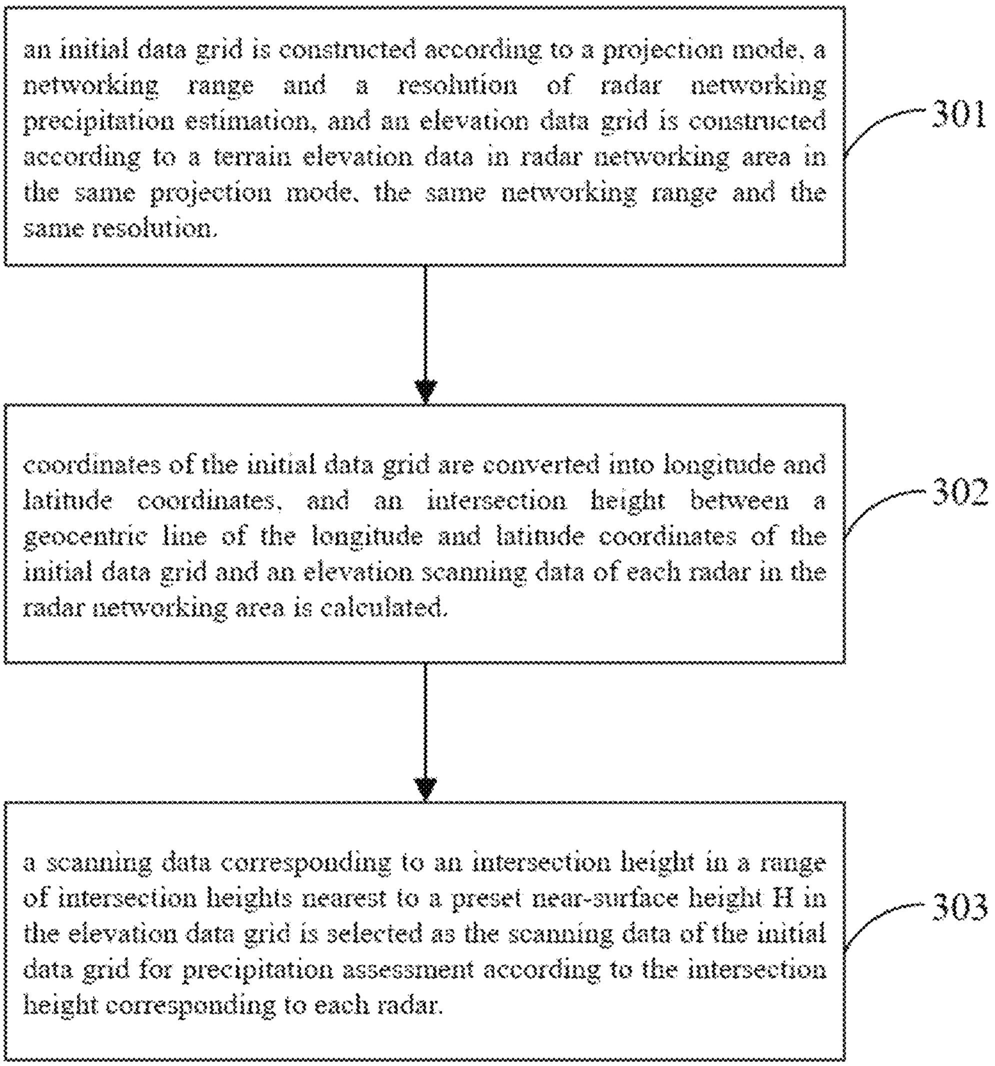
FIG. 2 is one of flow diagrams of the precipitation estimation method based on hybrid scanning of weather radar networking provided by the invention.

A precipitation estimation method based on hybrid scanning of weather radar networking is described in combination with FIG. 2 below, including the following steps.

In step 301: the initial data grid is constructed according to the projection mode the networking range and the resolution of the radar networking precipitation estimation, and the elevation data grid is constructed according to the terrain elevation data in the radar networking area in the same projection mode, networking range and resolution.

The projection mode of the radar networking precipitation estimation product is selected. The projection mode of the weather radar networking product is generally Mercator projection. In the projection mode, the initial data grid of networking precipitation rate is constructed according to the network range and resolution.

Figure 3:
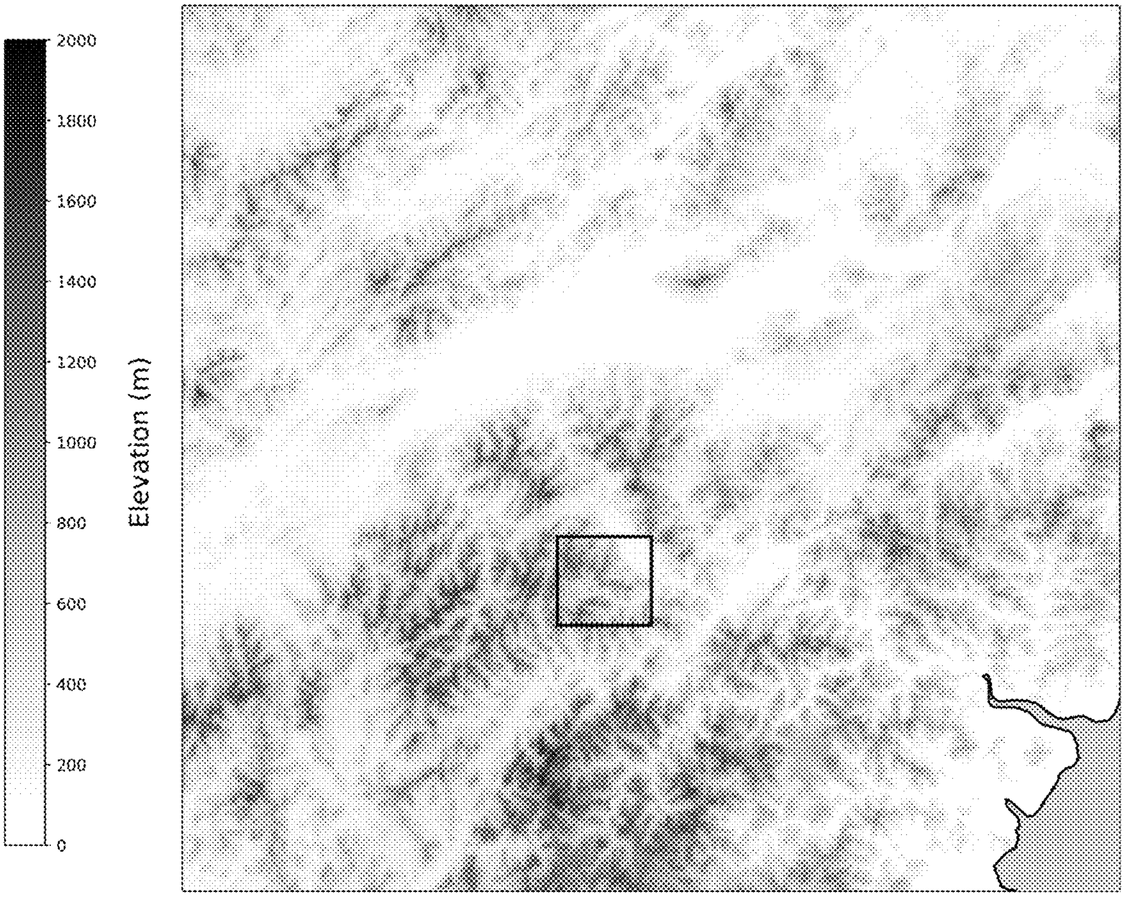
FIG. 3 is an elevation diagram of topographic grid points in the precipitation estimation method based on hybrid scanning of weather radar network provided by the invention.

The topographic elevation data of the networking area is obtained, and the elevation data grid of the networking area is constructed in the same projection mode, resolution and range of the networking precipitation rate. As shown in FIG. 3, different grid points represent different height values with different colors.

In step 302, the coordinates of the initial data grid are converted into longitude and latitude coordinates, and the intersection height of the geocentric line of the longitude and latitude coordinates of the initial data grid and the elevation scanning data of each radar in the radar networking area is calculated.

Figure 4:
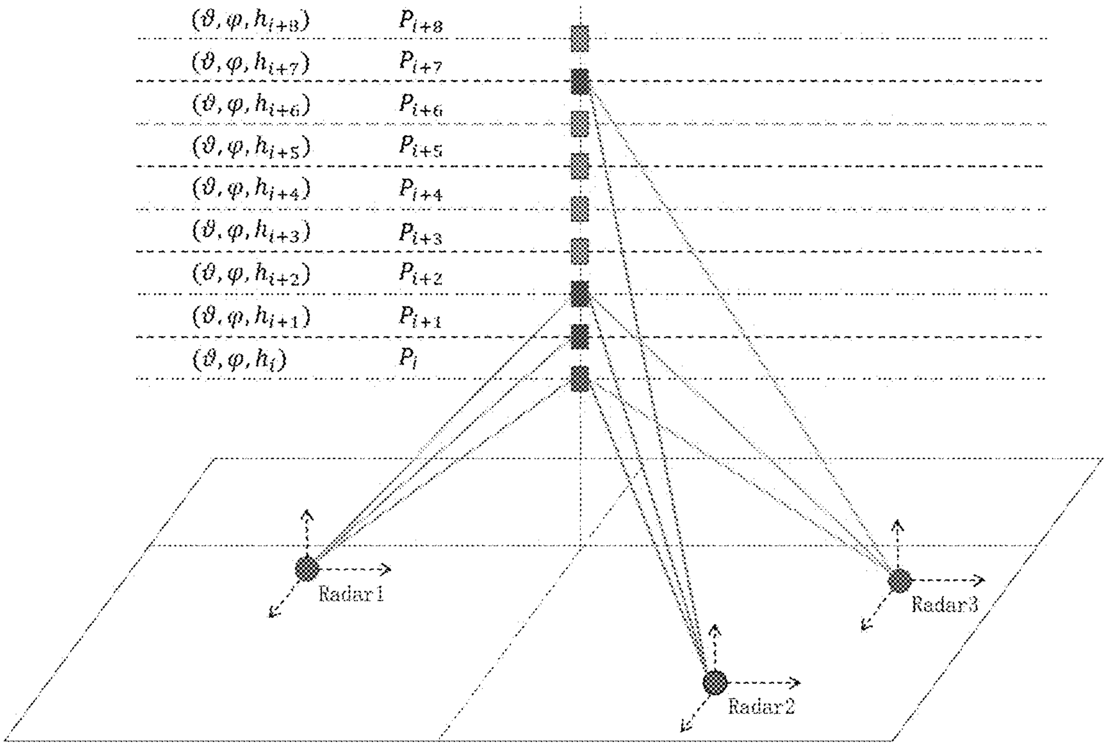
FIG. 4 is a schematic diagram of the intersection of all elevation scanning data of multiple radars in the precipitation estimation method based on hybrid scanning of weather radar networking provided by the invention.

The coordinates of the initial data grid constructed under the projection system are converted to latitude and longitude coordinates. For the longitude and latitude coordinate positions of each initial data grid, the intersection height of its geocentric line and all elevation scanning data of each radar in space is calculated, as shown in FIG. 4.

In step 303, according to the intersection height corresponding to each radar, scanning data corresponding to the intersection height in the range of intersection heights nearest to the preset near-surface height H in the elevation data grid are selected as the scanning data of the initial data grid for precipitation assessment.

The near-surface height data is selected. Assuming that the near-surface height above the terrain height is H and the data redundancy thickness is T, the redundancy selection range is H−T/2 to H+T/2.

According to the preset near-surface height H and the corresponding intersection height of each radar, the hybrid scanning data of the initial data grid is selected. When scanning data is selected, the principle is nearest to the preset near-surface height H. The preset near-surface height H selects the optimal value according to the elevation data of the detection area.

Figure 5:
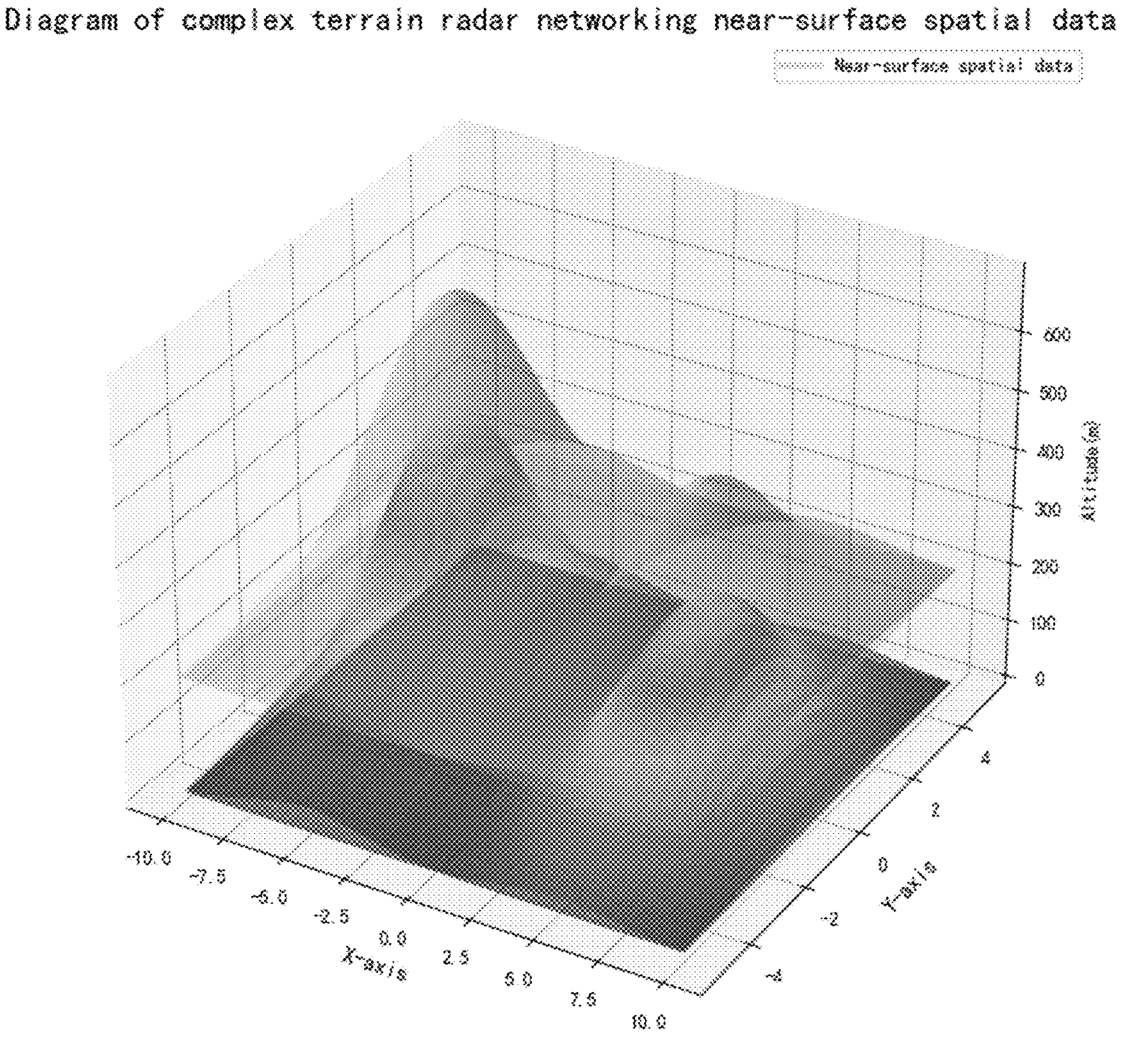
FIG. 5 is a schematic diagram of hybrid scanning data of near-surface radar networking of different terrains in the precipitation estimation method based on hybrid scanning of weather radar networking provided by the invention.

FIG. 5 shows a surface diagram of the undulating terrain. The upper gray color is the near-surface height screened out under different terrain. The gray near-surface data obtained by the networking radar through hybrid scanning is used for precipitation estimation inversion.

The maximum and minimum intersection heights of the geocentric line of the latitude and longitude coordinates of the initial data grid and the elevation scanning data of each radar can be determined. The middle height in the range between the intersection heights is obtained by dividing the difference between the maximum intersection height minus the minimum intersection height by 2. The difference between the middle height and the preset near-surface height H, as well as the difference between the maximum intersection height and the preset near-surface height H, and the difference between the minimum intersection height and the preset near-surface height H are calculated. The radar scanning data whose weighted sum of the three differences is less than the specified value is used as the scanning data of the initial data grid for precipitation assessment.

For example, assuming that the preset near-surface height H is the height $h_{i+3}$ in FIG. 4, and the minimum intersection height of radar 1 is $h_i$, the maximum intersection height is $h_{i+2}$, and the middle height is $h_{i+1}$. The minimum intersection height of radar 2 and radar 3 is h, the maximum intersection height is $h_{i+7}$, and the middle height is $h_{i+3}$. Finally, the scanning data of radar 2 and radar 3 are selected as the scanning data of the initial data grid.

In this embodiment, terrain elevation data is introduced on the basis of radar networking to obtain multi-altitude layer data of terrain-based networking radar hybrid scanning, and initial data grid is constructed on the basis of multi-radar networking observation. The networking radar scanning data in the near-surface range is selected to mix according to the terrain data, and the near-surface data in the overlapping observation area of multiple radars is selected. The precipitation is estimated based on the effective scanning data of the adjacent surface under the terrain, and the networking hybrid scanning data can effectively avoid the influence of ground objects, and the data selection is not limited by the radar body scanning mode. Through the setting of the near surface range, the idea of the effective scanning data of the nearest surface can be applied to the whole range of the radar networking area, so as to optimize the application data selection of the precipitation estimation algorithm and improve the precipitation estimation ability of weather radar networking.

On the basis of the above embodiments, taking the scanning data corresponding to the nearest intersection height as the scanning data of the initial data grid for precipitation assessment, including:

In the case that the scanning data nearest to the preset near-surface height H in the elevation data grid is dual polarization radar scanning data, taking the entire dual polarization amount of the scanning data nearest to the preset near-surface height H in the elevation data grid as the scanning data of the initial data grid for precipitation assessment.

If the scanning data of multiple radars is taken as the scanning data of the initial data grid, the dual polarization radar scanning data is preferred as the scanning data of the initial data grid for precipitation assessment.

If the scanning data nearest to the preset near-surface height H in the elevation data grid is a dual polarization radar scanning data, the initial data grid can store the entire dual polarization amount of the scanning data nearest to the preset near-surface height H in the elevation data grid in a one-dimensional manner.

On the basis of the above embodiments, according to the intersection height corresponding to each radar, selecting the scanning data corresponding the scanning position nearest to the preset near-surface height H in the elevation data grid as the scanning data of the initial data grid for precipitation assessment, including:

in the case that the scanning data nearest to to the preset near-surface height H in the elevation data grid is single polarization radar scanning data, determining whether there is dual polarization radar scanning data intersecting the intersection height in the range of intersection heights between the redundancy selection range H−T/2 and H+T/2, and Tis the data redundancy thickness;

if there is dual polarization radar scanning data, taken the dual polarization radar scanning data as scanning data of the initial data grid for precipitation evaluation;

if no dual polarization radar scanning data exists, taking the single polarization radar scanning data as scanning data for the initial data grid for precipitation assessment.

Single polarization weather radar emits a single polarization wave, usually a horizontal polarization wave, which can obtain the parameters of reflectivity factor (Z), Doppler velocity (V) and velocity spectral width (W). Dual polarization weather radar is the upgrade of single polarization radar, sending horizontal and vertical polarization electromagnetic waves at the same time, which can further obtain the dual polarization parameters such as cocorrelation coefficient (CC), differential reflectivity ($Z_{DR}$), differential propagation phase shift ($\varphi_{DP}$) and differential phase shift rate ($K_{DP}$) in addition to the parameters of single polarization reflectivity factor (Z), Doppler velocity (V) and velocity spectrum width (W).

If the scanning data nearest to the preset near-surface height H in the elevation data grid are single polarization radar scanning data, dual polarization quantity scanning data where the range between minimum and maximum intersection heights intersects with the redundant selection range are searched.

If dual polarization radar scanning data exists, the single polarization radar scanning data is replaced by the dual polarization radar scanning data searched in the redundant selection range, and this initial data grid records the dual polarization radar scanning data.

If no dual polarization radar scanning data exists, this initial data grid records single polarization radar scanning data.

Figure 6:
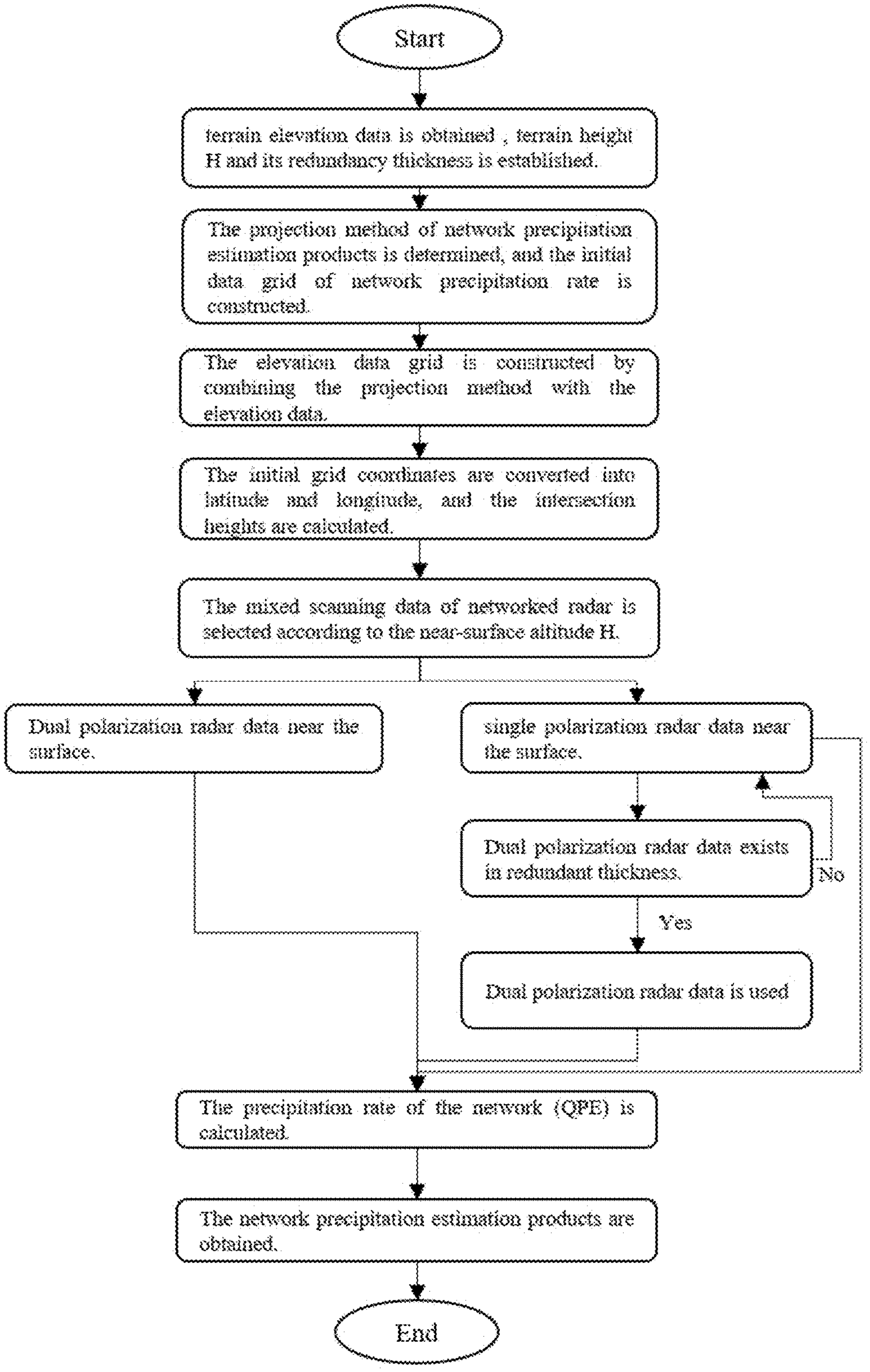
FIG. 6 is the second flow diagram of the precipitation estimation method based on hybrid scanning of weather radar networking provided by the invention.

After data selection and processing of all the grids in the initial data grid, the precipitation rate is calculated. When the precipitation rate is calculated, the data of each grid is traversed. After the precipitation rate of the hybrid canning data of the single time networking radar is obtained, the accumulated precipitation estimate value is obtained through time accumulation, and the networking precipitation estimate product is generated. The complete flow of precipitation estimation method based on hybrid scanning of weather radar networking is shown in FIG. 6.

On the basis of the above embodiments, selecting the scanning data corresponding to the intersection height in the range of the intersection heights nearest to the preset near-surface height H in the elevation data grid as the scanning data of the initial data grid for precipitation assessment, including:

In the case that the scanning data of the initial data grid is single polarization radar scanning data, performing the precipitation assessment using the Z-R relationship well known in the art according to the single polarization radar scanning data.

In the calculation of precipitation rate, each grid data is traversed to distinguish calculation of single and dual polarization data. If the scanning data of the initial data grid is the single polarization radar scanning data, the Z-R relationship is directly applied to calculate the precipitation rate.

On the basis of the above embodiments, selecting the scanning data corresponding to the intersection height in the range of the intersection heights nearest to the preset near-surface height H in the elevation data grid as the scanning data of the initial data grid for precipitation assessment, including:

in the case that the scanning data of the initial data grid are dual polarization radar scanning data, using quantitative precipitation estimation algorithm (QPE) to evaluate the precipitation based on the dual polarization radar scanning data.

Figure 7:
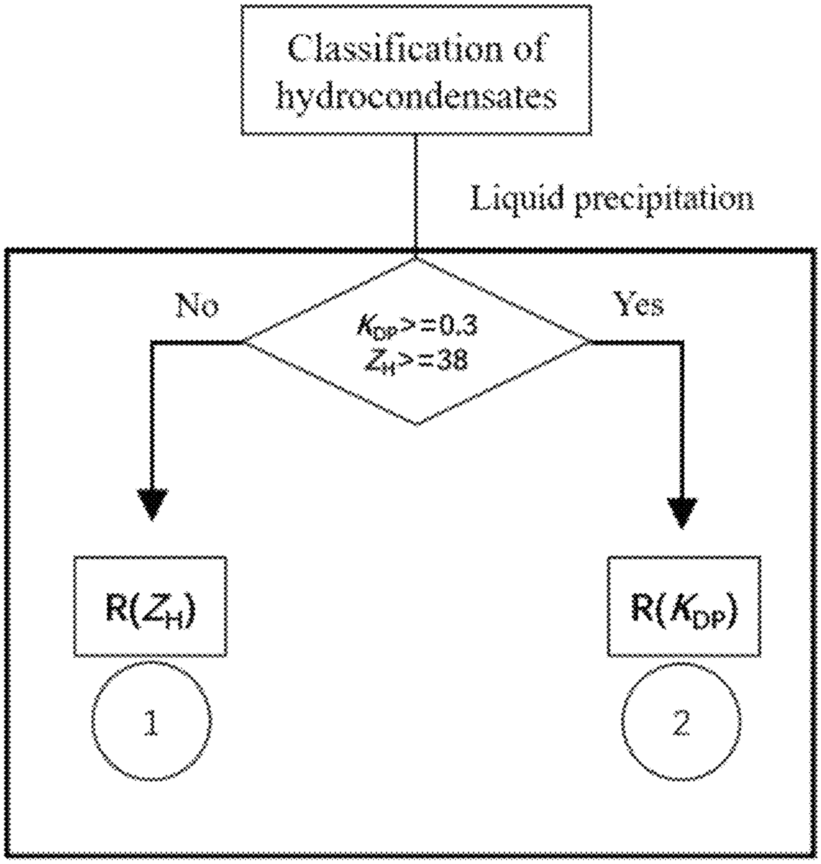
FIG. 7 is a schematic flow diagram of the precipitation intensity estimation of dual polarization radar in the precipitation estimation method based on hybrid scanning of weather radar networking provided by the invention.

On the basis of the above embodiments, as shown in FIG. 7, using the quantitative precipitation estimation algorithm to evaluate precipitation based on the dual polarization radar scanning data in this embodiment, including:

in the case that the radar reflectivity factor in the dual polarization radar scanning data is greater than the first preset threshold, and the radar differential propagation phase shift rate is greater than the second preset threshold, determining the precipitation type as non-liquid precipitation, and calculating the precipitation rate according to the radar reflectivity factor;

in the case that the radar reflectivity factor is less than or equal to the first preset threshold, or the radar differential propagation phase shift rate is less than or equal to the second preset threshold, determining the precipitation type as liquid precipitation, and calculating the precipitation rate according to the radar differential propagation phase shift rate.

Wherein, the radar reflectivity factor ($Z_H$)(dBZ) represents the unit of echo intensity of the precipitation target, which is related to the size, the number and the phase state of the precipitation particles in the unit volume of the precipitation target.

Differential propagation phase shift rate ($K_{DP}$) of dual polarization radar represents the propagation phase difference between horizontal and vertical channels per unit distance, and is a derivative of differential propagation phase shift ($\varphi_{DP}$).

If the scanning data of the initial data grid is dual polarization radar scanning data, the quantitative precipitation estimation algorithm is used for precipitation assessment, as shown in FIG. 7. Firstly, the phase classification of the hybrid scanning data is calculated. Then according to the phase types of precipitation particles in the networking data of hybrid scanning, the precipitation types are roughly divided into liquid and non-liquid. Finally, different formulas for calculating precipitation rate are selected according to the radar differential propagation phase shift rate $K_{DP}$ and radar reflectivity factor $Z_H$.

On the basis of the above embodiments, as shown in FIG. 7, in this embodiment, the precipitation rate R is calculated according to the radar reflectivity factor $Z_H$ by the following formula:

$$R(Z_H) = 0.019Z_H^{0.761};$$

The precipitation rate R is calculated according to the radar differential propagation phase shift rate $K_{DP}$ by the following formula:

$$R(K_{DP}) = 44.84K_{DP}^{0.763}.$$

The invention has the following advantages. Firstly, the near-surface radar reflectivity factor data related to terrain is obtained through the hybrid scanning mode of networking radar, which solves the influence of terrain fluctuation on data and obtains effective near-surface scanning data. Secondly, the method is not limited by the radar scanning mode and radar band, that is, it can also obtain all the scanning data of the near-surface in the networking area for precipitation estimation in the multi-band radar networking detection. Thirdly, a reasonable data selection method is designed for single polarization and dual polarization radar. Fourthly, the near-surface data constructed by radar networking hybrid scanning can also be used as the basis for inversion of a series of products such as phase classification.

The precipitation estimation device based on hybrid scanning of weather radar networking provided by the invention is described below. The precipitation estimation device based on hybrid scanning of weather radar networking described below and the precipitation estimation method based on hybrid scanning of weather radar networking described above can be corresponded to and referred to each other.

Figure 8:
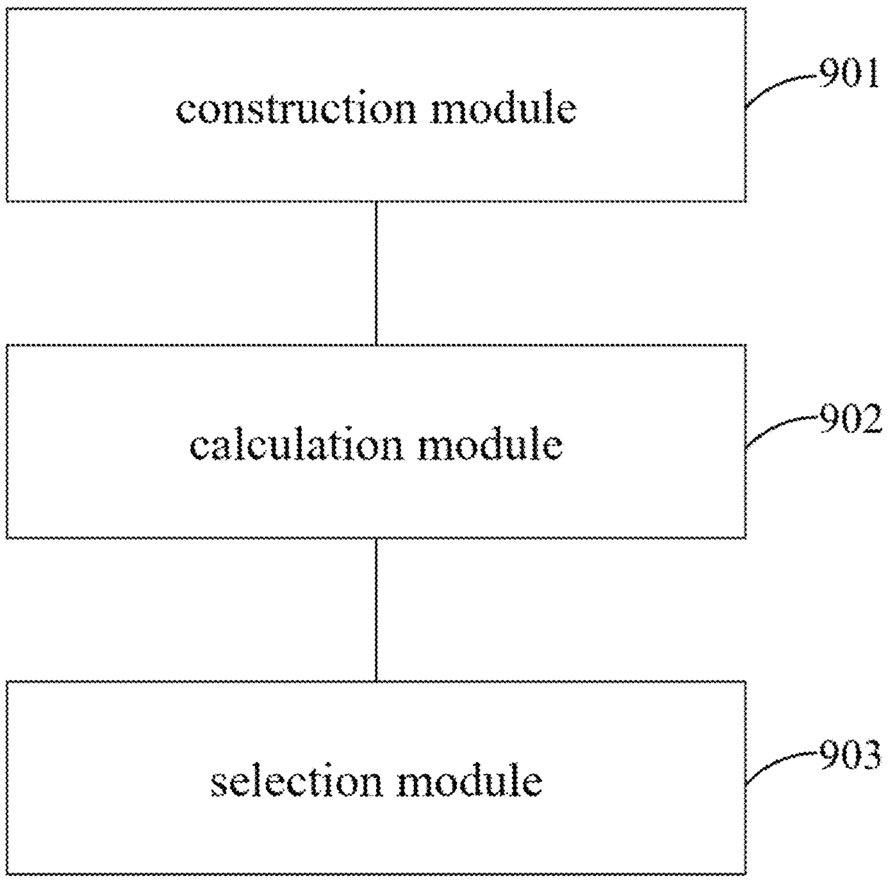
FIG. 8 is a structural diagram of a precipitation estimation device based on hybrid scanning of weather radar networking provided by the invention.

As shown in FIG. 8, the device comprises a construction module 901, a calculation module 902, and a selection module 903, wherein:

the construction module 901 is configured to construct the initial data grid according to the projection mode, the networking range and the resolution of the radar networking precipitation estimation, and construct the elevation data grid according to the terrain elevation data in the radar networking area in the same projection mode, networking range and resolution; the calculation module 902 is configured to convert the coordinates of the initial data grid into longitude and latitude coordinates, and calculate the intersection height of the geocentric line of the longitude and latitude coordinates of the initial data grid and the elevation scanning data of each radar in the radar networking area;

the selection module 903 is configured to select the scanning data corresponding to the intersection height in the intersection heights nearest to the preset near-surface height H in the elevation data grid as the scanning data of the initial data grid for precipitation assessment according to the intersection height corresponding to each radar.

In this embodiment, terrain elevation data is introduced on the basis of radar networking to obtain multi-altitude layer data of terrain-based networking radar hybrid scanning, and initial data grid is constructed on the basis of multi-radar networking observation. The networking radar scanning data in the near-surface range is selected to mix according to the terrain data, and the near-surface data in the overlapping observation area of multiple radars is selected. The precipitation is estimated based on the effective scanning data of the adjacent surface under the terrain, and the networking hybrid scanning data can effectively avoid the influence of ground objects, and the data selection is not limited by the radar body scanning mode. Through the setting of the near surface range, the idea of the effective scanning data nearest to the surface can be applied to the whole range of the radar networking area, so as to optimize the application data selection of the precipitation estimation algorithm and to improve the precipitation estimation ability of weather radar networking.

Figure 9:
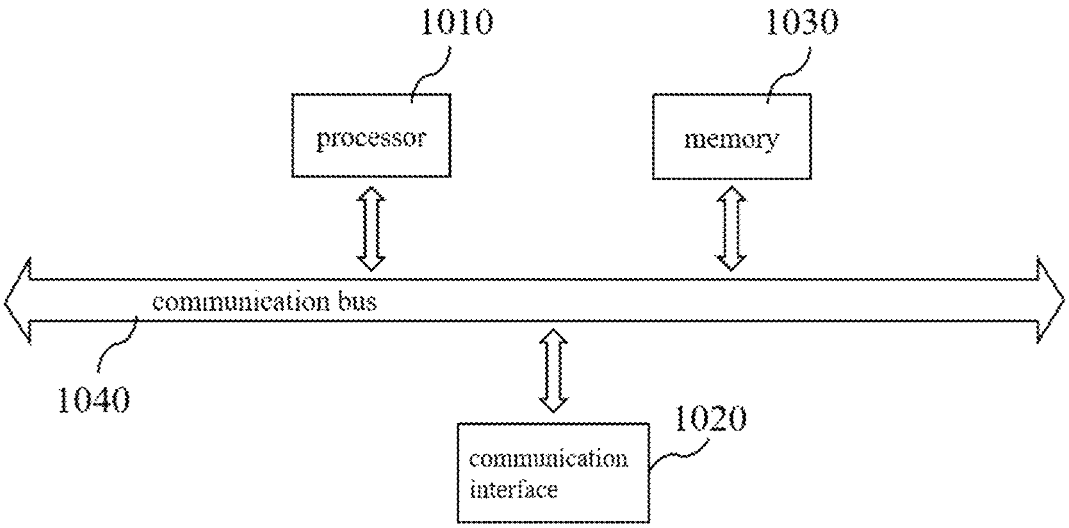
FIG. 9 is a structural diagram of an electronic device provided by the invention.

FIG. 9 shows an example of a physical structure diagram of an electronic device, as shown in FIG. 9, which may include: a processor 1010, a communications interface 1020, a memory 1030 and a communication bus 1040, wherein, the processor 1010, the communication interface 1020, and the memory 1030 communicate with each other through the communication bus 1040. The processor 1010 can invoke logical instructions in memory 1030 to execute a precipitation estimation method based on hybrid scanning of weather radar networking, which includes: constructing the initial data grid according to the projection mode, the networking range and the resolution of radar networking precipitation estimation, constructing the elevation data grid according to the terrain elevation data in radar networking area in the same projection mode, networking range and resolution; converting the coordinates of the initial data grid into longitude and latitude coordinates, and calculating the intersection height between the geocentric line of the longitude and latitude coordinates of the initial data grid and the elevation scanning data of each radar in the radar networking area; selecting the scanning data corresponding to the intersection height in the range of the intersection heights nearest to the preset near-surface height H in the elevation data grid as the scanning data of the initial data grid for precipitation assessment according to the intersection height corresponding to each radar.

In addition, the logic instructions in the memory 1030 can be implemented in the form of software functional units and sold or used as stand-alone products, which can be stored in a computer-readable storage medium. Based on the understanding of the essence of the technical solution of the invention or the part which contributes to the existing technology or the part of the technical solution can be in the form of a software product, the computer software products are stored in a storage medium, including several instructions to enable a computer equipment (a personal computer, a server, or a network device and the like) to perform all or part of the steps of the method described in various embodiments of the invention. The mentioned storage media above include: U disk, mobile hard disk, read-only Memory (ROM, Read Only Memory), Random Access memory (RAM, Random Access Memory), disk or disc and other medium that can store program codes.

On the other hand, the invention further provides a computer program product, which includes a computer program, which can be stored on a non-transient computer-readable storage medium, and when the computer program is executed by a processor, the computer can perform the precipitation estimation method based on hybrid scanning of weather radar networking provided by the invention, which includes: constructing the initial data grid according to the projection mode, the networking range and the resolution of radar networking precipitation estimation, constructing the elevation data grid according to the terrain elevation data in radar networking area in the same projection mode, networking range and resolution; converting the coordinates of the initial data grid into longitude and latitude coordinates, and calculating the intersection height between the geocentric line of the longitude and latitude coordinates of the initial data grid and the elevation scanning data of each radar in the radar networking area; selecting the scanning data corresponding to the intersection height in the range of the intersection heights nearest to the preset near-surface height H in the elevation data grid as the scanning data of the initial data grid for precipitation assessment according to the intersection height corresponding to each radar.

On the other hand, the invention further provides a non-transient computer-readable storage medium on which a computer program is stored, and when the computer program is executed by a processor, the precipitation estimation method based on hybrid scanning of weather radar networking provided by the invention is implemented, including: constructing the initial data grid according to the projection mode, the networking range and the resolution of radar networking precipitation estimation, constructing the elevation data grid according to the terrain elevation data in radar networking area in the same projection mode, networking range and resolution; converting the coordinates of the initial data grid into longitude and latitude coordinates, and calculating the intersection height between the geocentric line of the longitude and latitude coordinates of the initial data grid and the elevation scanning data of each radar in the radar networking area; selecting the scanning data corresponding to the intersection height in the range of the intersection heights nearest to the preset near-surface height H in the elevation data grid as the scanning data of the initial data grid for precipitation assessment according to the intersection height corresponding to each radar.

The device embodiment described above are schematic, where the units described as separate components may or may not be physically separate, and the components shown as units may or may not be physical units, that is, may be located in one place, or may be distributed over multiple network units. Some or all of the modules can be selected according to actual needs to realize the purpose of this embodiment solution. It can be understood and implemented by ordinary skill in the art without creative labor.

By the description of the above embodiments, those skilled in the art can clearly understand that embodiments can be implemented by means of software plus the necessary common hardware platform, and of course by hardware. Based on this understanding, the essence of the above technical solution or the part which contributes to the existing technology can be in the form of a software product, the computer software product can be stored in a computer readable storage medium, such as ROM/RAM, disk, CD, and the like, including several instructions to enable a computer equipment (a personal computer, a server, or a network equipment, and the like) to perform the methods described in each embodiment or some part of the embodiment.

Finally, it should be noted that the above embodiment is used to illustrate the technical solution of the invention, and not to limit it. Notwithstanding the detailed description of the invention by reference to the above embodiments, it should be understood by the ordinary skill in the art that the technical solution recorded in the above embodiments may be modified or some of the technical features thereof are replaced; Such modification or replacement shall not make the essence of the corresponding technical solutions depart from the spirit and scope of the technical solution of each embodiment of the invention.

What is claimed is:

1. A precipitation estimation method based on hybrid scanning of weather radar networking, characterized by comprising:

deploying multiple radars comprising dual polarization radar and single polarization radar in an area to form a weather radar network and observing together through the hybrid scanning to obtain scanning data by the multiple radars;

obtaining an initial configuration data of the multiple radars from the weather radar network, the initial configuration data comprises a terrain elevation data and an elevation scanning data;

constructing an initial data grid according to a projection mode, a networking range and a resolution of radar networking precipitation estimation, and constructing an elevation data grid according to the terrain elevation data in radar networking area in the same projection mode, the same networking range and the same resolution;

converting coordinates of the initial data grid into longitude and latitude coordinates, and calculating an intersection height between a geocentric line of the longitude and latitude coordinates of the initial data grid and the elevation scanning data of each radar in the radar networking area;

selecting the scanning data corresponding to an intersection height in a range of intersection heights nearest to a preset near-surface height H in the elevation data grid as the scanning data of the initial data grid and performing precipitation assessment according to the intersection height corresponding to each radar;

selecting the scanning data corresponding to a scanning position nearest to the preset near-surface height H in the elevation data grid as the scanning data of the initial data grid and performing precipitation assessment according to the intersection height corresponding to each radar, comprising:

in the case that the scanning data nearest to the preset near-surface height H in the elevation data grid is the scanning data from the single polarization radar, determining whether there is dual polarization radar scanning data intersecting the intersection height between a redundancy selection range H−T/2 and H+T/2, and T is a data redundancy thickness;

if there is the scanning data from dual polarization radar, taking the scanning data from the dual polarization radar as the scanning data of the initial data grid and performing precipitation assessment;

if no the scanning data from the dual-polarization radar exists, taking the scanning data from the single polarization radar as the scanning data of the initial data grid and performing precipitation assessment.

2. The precipitation estimation method based on hybrid scanning of weather radar networking according to claim 1, selecting the scanning data corresponding to a scanning position nearest to the preset near-surface height H in the elevation data grid as the scanning data of the initial data grid for precipitation assessment according to the intersection height corresponding to each radar, comprising:

in the case where the scanning data nearest to the preset near-surface height H in the elevation data grid is the scanning data from the dual polarization radar, taking an entire dual polarization amount of the scanning data nearest to the preset near-surface height H in the elevation data grid as the scanning data of the initial data grid for precipitation assessment.

3. The precipitation estimation method based on hybrid scanning of weather radar networking according to claim 1, characterized in that selecting the scanning data corresponding to the intersection height in the range of the intersection heights nearest to the preset near-surface height H in the elevation data grid as the scanning data of the initial data grid for precipitation assessment, including:

In the case that the scanning data of the initial data grid is the scanning data from the single polarization radar, performing the precipitation assessment using a Z-R relationship according to the scanning data from the single polarization radar.

4. The precipitation estimation method based on hybrid scanning of weather radar networking according to claim 1, characterized in that selecting the scanning data corresponding to the intersection height in the range of the intersection heights nearest to the preset near-surface height H in the elevation data grid as the scanning data of the initial data grid for precipitation assessment, including:

in the case that the scanning data of the initial data grid is the scanning data from the dual polarization radar, using a quantitative precipitation estimation algorithm to evaluate the precipitation according to the scanning data from the dual polarization radar.

5. The precipitation estimation method based on hybrid scanning of weather radar networking according to claim 4, characterized in that using the quantitative precipitation estimation algorithm to evaluate the precipitation according to the scanning data from the dual polarization radar, including:

in the case that a radar reflectivity factor in the scanning data from the dual polarization radar is greater than a first preset threshold, and a radar differential propagation phase shift rate is greater than a second preset threshold, determining a precipitation type as non-liquid precipitation, and calculating a precipitation rate according to the radar reflectivity factor;

in the case that the radar reflectivity factor is less than or equal to the first preset threshold value, or the radar differential propagation phase shift rate is less than or equal to the second preset threshold value, determining the precipitation type as liquid precipitation, and is calculating the precipitation rate according to the radar differential propagation phase shift rate.

6. The precipitation estimation method based on hybrid scanning of weather radar networking according to claim 5, characterized in that the precipitation rate R is calculated according to the radar reflectivity factor $Z_H$ by the following formula:

$$R(Z_H) = 0.019Z_H^{0.761};$$

the precipitation rate R is calculated according to the radar differential propagation phase shift rate $K_{DP}$ by the following formula:

$$R(K_{DP}) = 44.84K_{DP}^{0.763}.$$

7. A precipitation estimation device based on hybrid scanning of weather radar networking, the weather radar networking is performed by multiple radars comprising dual polarization radar and single polarization radar, which are deployed in an area and observe together to obtain scanning data, characterized by comprising:

a construction module, configured to construct an initial data grid according to a projection mode, a networking range and a resolution of radar networking precipitation estimation, and to construct an elevation data grid according to a terrain elevation data in a radar networking area in the same projection mode, the same networking range and the same resolution;

a calculation module, configured to convert coordinates of the initial data grid into longitude and latitude coordinates, and to calculate an intersection height of a geocentric line of the longitude and latitude coordinates of the initial data grid and the elevation scanning data of each radar in the radar networking area;

a selection module, configured to select a scanning data corresponding to an intersection height in a range of intersection heights nearest to a preset near-surface height H in the elevation data grid as the scanning data of the initial data grid for precipitation assessment according to the intersection height corresponding to each radar;

wherein the selection module is specifically configured to:

determine whether there is the scanning data from the dual polarization radar intersecting the intersection height between a redundancy selection range H−T/2 and H+T/2, and T is a data redundancy thickness in the case that the scanning data nearest to the preset near-surface height H in the elevation data grid is the scanning data from the single polarization radar;

take the scanning data from the dual polarization radar as the scanning data of the initial data grid for precipitation evaluation if there is the scanning data from the dual polarization radar-scanning data;

take the scanning data from the single polarization radar as the scanning data of the initial data grid for precipitation assessment if no dual-polarization radar scanning data exists.

8. An electronic device comprising a memory, a processor and a computer program stored on the memory and capable of running on the processor, characterized in that the processor executes the program to implement a precipitation estimation method based on hybrid scanning of weather radar networking according to claim 1.

9. A non-transient computer-readable storage medium on which a computer program is stored, characterized in that the computer program, when executed by a processor, implements a precipitation estimation method based on hybrid scanning of a weather radar networking according to claim 1.

* * * * *